(12) United States Patent
Buck

(10) Patent No.: US 8,733,294 B2
(45) Date of Patent: May 27, 2014

(54) ANIMAL PEN DOOR

(76) Inventor: Roger Buck, Loddon (GB)

( * ) Notice: Subject to any disclaimer, the term of this patent is extended or adjusted under 35 U.S.C. 154(b) by 104 days.

(21) Appl. No.: 13/334,527

(22) Filed: Dec. 22, 2011

(65) Prior Publication Data
US 2013/0160717 A1    Jun. 27, 2013

(51) Int. Cl.
  *A01K 1/00*    (2006.01)
  *E06B 1/04*    (2006.01)
(52) U.S. Cl.
  USPC ........... 119/524; 119/502; 119/481; 119/484; 52/205
(58) Field of Classification Search
  USPC .............. 119/481, 501, 502, 524, 484; 52/32, 52/205; 49/381
  See application file for complete search history.

(56) References Cited

U.S. PATENT DOCUMENTS

| | | | | |
|---|---|---|---|---|
| 202,722 | A | * | 4/1878 | Harrington ..................... 49/381 |
| 3,215,118 | A | * | 11/1965 | Behlen ............................ 52/143 |
| 2005/0115514 | A1 | | 6/2005 | Wang |

FOREIGN PATENT DOCUMENTS

WO    0015460    3/2000

OTHER PUBLICATIONS

Search Report for Corresponding Application GB1013243.9, Intellectual Property Office of the United Kingdom, Dec. 22, 2010.

* cited by examiner

*Primary Examiner* — Kristen C Hayes
(74) *Attorney, Agent, or Firm* — Etherton Law Group, LLC

(57) ABSTRACT

An animal pen according to the invention comprises an access wall spanning the width of the pen between two side walls. An access door in the access wall is hinged to a vertical hanging post and closes against a vertical slam post. A first of the posts, which may be the hanging post or the slam post, is supported at its top end not by a door lintel extending between the hanging post and the slam post but by a diagonal brace member extending between the top of the said first post and the top of its adjacent side wall, and the second of the posts is supported either by being located at a junction between the access wall and its adjacent side wall or by a similar diagonal brace member extending between the top of the said second post and the top of its adjacent side wall.

5 Claims, 2 Drawing Sheets

ANIMAL PEN DOOR

FIELD OF INVENTION

The invention relates to the mounting of an access door in an animal pen such as a dog pen, and to animal pens with such access doors.

BACKGROUND

Dog pens conventionally are either free-standing structures or are built onto existing buildings. In the former case they typically comprise four walls with an access door in one of the walls (referred to herein as the access wall). In the latter case they typically comprise two or three walls with the third and fourth walls being one or two walls existing building, and the access wall being the wall facing the back wall of the pen. If multiple dog pens are constructed side by side, as is often the case with commercial dog boarding kennels, then the side walls extending from the access walls to the back of the dog pens can be shared between adjacent dog pens.

The walls may be solid walls or cage walls of metal mesh or metal bars mounted on an outer frame, or may be part solid and part cage walls. The height of the walls, for reasons of economy, is generally less than the height of an average human adult. The height merely has to be sufficient to prevent a dog from jumping out of the pen, and additional height above that basic minimum is an unnecessary expense. Typically therefore the pen walls are at most 1.75 metres tall. The means that the access door is also at most 1.75 metres tall, and when human adults enter the dog pen for cleaning purposes or to care for the animal within the pen, they must duck under the door lintel which is at or below head height. This can be an irritation when staff in a boarding kennels are constantly bumping their heads on the door lintels. It can even give rise to compensation claims under health and safety legislation. The alternatives so far proposed, however, are expensive. Those alternatives are to have a full height access wall including a full height access door, or to have a full height door and door frame in an otherwise lower access wall. By "full height" in this context there is meant the height of a conventional modern domestic door, which is at least 2.1 metres tall.

SUMMARY OF INVENTION

The invention provides an animal pen provided with an access door as defined in claim 1 herein. The frame of the access door has no lintel, so the door may be of a height less than normal adult human height, but access into the pen does not require such an adult human to duck his or her head. The two door posts comprise one hanging post and one slam post, and the first of those two posts (which may be either the hanging post and the slam post) is rigidly supported at the top by the diagonal brace member and is thus held vertical without the need for a lintel. If desired a similar diagonal brace member may be provided for the second of the two posts, or the second of the two posts may be supported by being located at the junction of the access wall and a side wall, when it takes support from the side wall directly. A secure support for the hanging post is the more important because the hanging post has to support the weight of the door in use.

Preferably the door is hinged to swing inwardly into the pen, and preferably when fully open it is hinged to a position lying alongside the adjacent side wall. However when the door hanging post is supported at its top end by a diagonal brace member between the hanging post and the adjacent side wall, then when the door is opened it preferably opens to a position lying alongside the diagonal brace member. Thus when a staff member enters the pen to handle the animal inside or to clean out the pen, the open door protects that staff member from unintentionally hitting his or her head against the diagonal brace member. Even when the staff member has access to the space immediately beneath the diagonal brace member, the normal cleaning operation is the cleaning of the pen floor in that area, so that the natural human position is a stooping or crouching one, which involves minimal risk of striking one's head against the diagonal brace member.

DETAILED DESCRIPTION OF INVENTION

Figure 1:
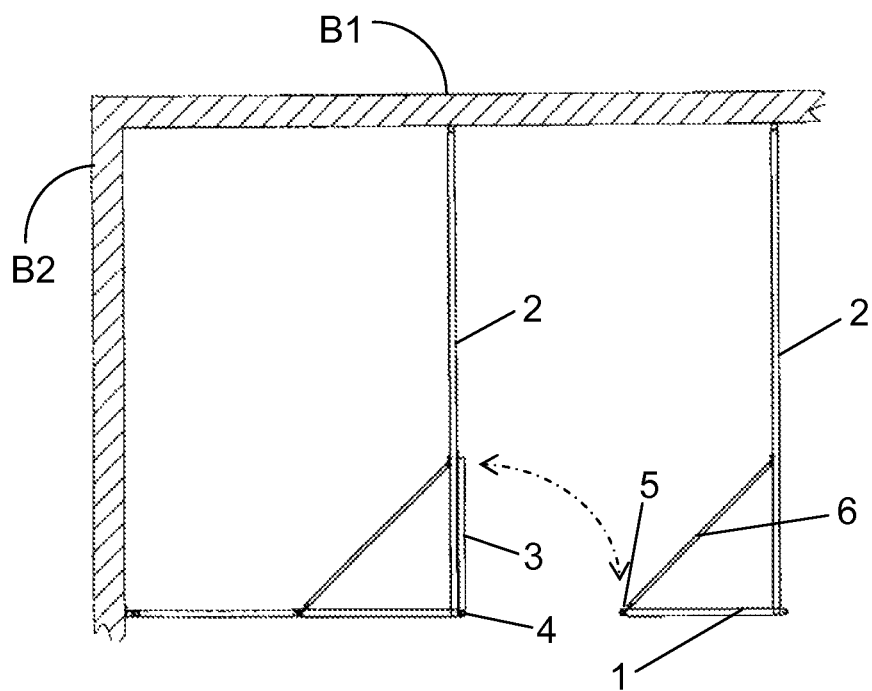
FIG. 1 is a plan view from above of a double animal pen, of which the right-hand pen as illustrated is a pen according to the invention.
Figure 2:
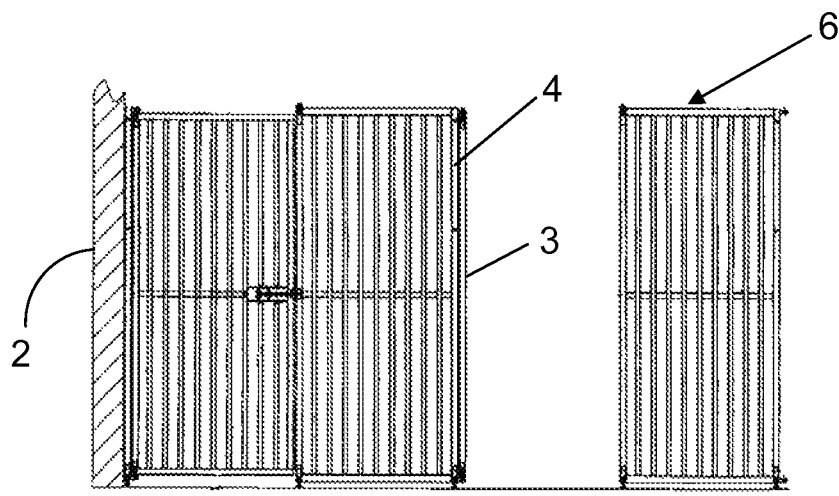
FIG. 2 is a front view of the access walls of the double animal pen of FIG. 1.
Figure 3:
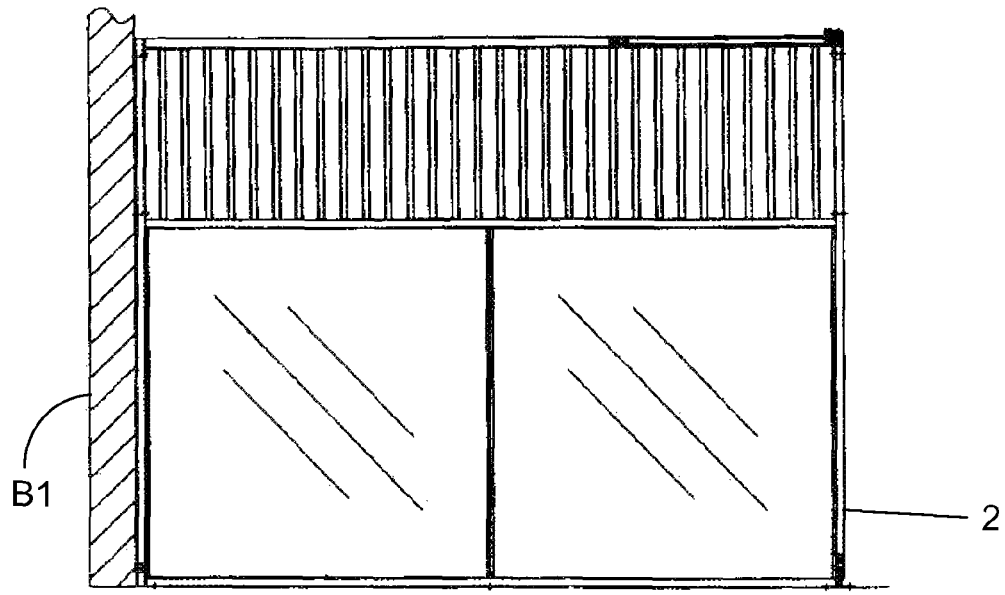
FIG. 3 is a left side view of the side wall separating the two animal pens of FIG. 1.
Figure 4:
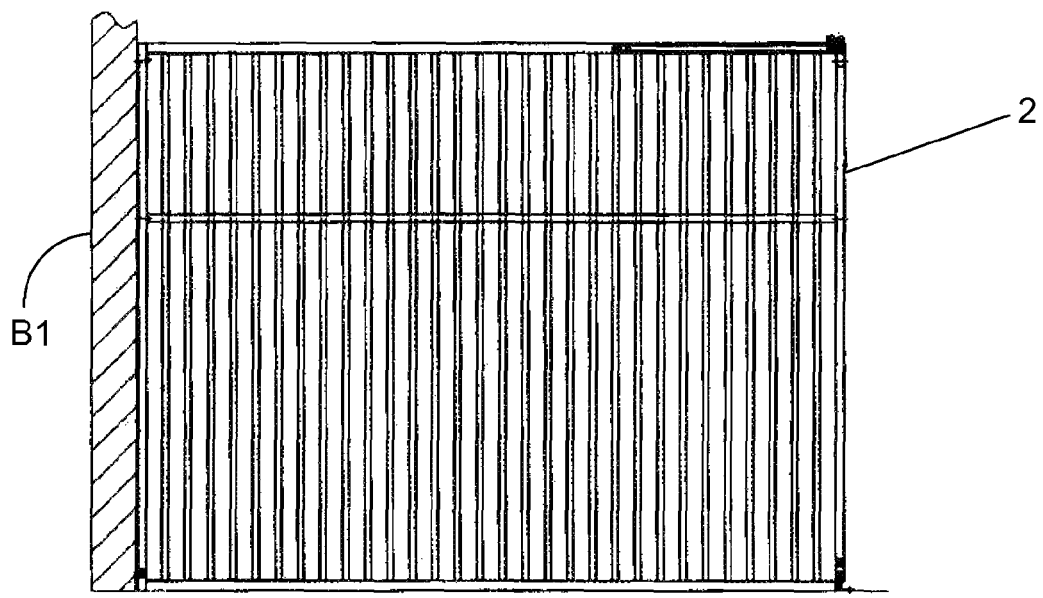
FIG. 4 is a left side view of an alternative design of the side wall separating the two animal pens of FIG. 1.

The double animal pen of FIG. 1 is constructed between two existing brick or block walls B1 and B2 of a building. The pen on the right is a pen according to the invention, as it comprises an access wall 1 spanning the distance between two side walls 2. The access wall 1 is the pen wall which incorporates an access door 3 which permits access to the pen. The pen rear wall is formed by the wall B1 of the existing building, although of course the animal pen may equally well be a single or double animal pen constructed as a free-standing structure with a back wall of similar construction to the two side walls 2. Those side walls 2 are constructed either as barred cage walls as illustrated in FIG. 4 or as solid panels at the bottom and barred portions at the top as illustrated in FIG. 3.

The hanging post 4 is located at a junction between the side wall 2 and the access wall 1 of the adjacent pen, and takes its vertical support from the perpendicular junction between the side wall 2 and the access wall of the adjacent (left hand) pen. A slam post 5 takes its vertical support from a diagonal brace member 6 which extends from the access wall 1 to the adjacent side wall 2, at approximately 45° to the plane of the access wall, in line with the top of the door. Both the hanging post 4 and the slam post 5 are bolted to the floor at their base. The hanging post 4 is stable and secure because it is supported by the mutually perpendicular walls which it abuts. The slam post is stable and secure because it is supported at the top by the triangulation of the mutually perpendicular walls and the diagonal brace member 6. The door therefore opens and closes in a stable and reliable manner without the need for a top lintel, and this is a great advantage in an animal pen because the door can be made less than full height without the disadvantage of a user having to duck under the lintel. Neither is a ground level threshold strip needed, so that the dog pen can be swept clean without having to lift the sweepings over such a threshold strip. If a user wishes to clean out the floor area immediately beneath the diagonal brace member 6, then the natural position is a stooped posture, so that even when obtaining access to that area immediately beneath the brace member 6, the user is not likely to hit his or her head on the brace member.

Although not illustrated, it will be appreciated that the door may be hinged on the opposite hand to that shown in FIG. 1, in which case the roles of hanging post and slam post will be reversed as compared to those described above. For a wider animal pen, the post 4 which is shown in FIG. 1 as being tight against the side wall 2 may be spaced from that side wall 2, in which case it is supported by a second diagonal brace member entirely similar to the brace member 6 illustrated in FIG. 1. The brace members may be aligned at from 30° to 60° to the plane of the access wall, although the illustrated angle of about 45° is preferred.

What is claimed is:

1. An animal pen door of an animal pen, the animal pen having a first side wall adjacent and perpendicular to an access wall and a second side wall spaced from the first side wall and adjacent and perpendicular to the access wall, the animal pen door comprising:
   an access door hinged to the access wall at a vertical first post having a top and a bottom and closing against a vertical second post having a top and a bottom;
   wherein the first post is supported at its top not by a door lintel extending between the first post and the second post but by a first diagonal brace member extending between the top of the first post and the top of its adjacent first side wall; and
   wherein the second post is supported either by being located at a junction between the access wall and an adjacent side wall or by a second diagonal brace member extending between the top of the second post and the top of its adjacent second side wall.

2. The animal pen of claim 1 wherein the first post is a slam post.

3. The animal pen of claim 2 wherein the first post is supported by being located at a junction between the access wall and the adjacent side wall, and the access door opens inwardly into the pen, so that the access door opens flat against the adjacent first side wall.

4. The animal pen of claim 1 wherein the first diagonal brace member forms an angle between 30° and 60° with the access wall.

5. The animal pen of claim 4 wherein the diagonal brace member forms an angle of about 45° with the access wall.

* * * * *